US007965198B2

(12) United States Patent
Yanase

(10) Patent No.: US 7,965,198 B2
(45) Date of Patent: Jun. 21, 2011

(54) ROAD-TO-VEHICLE COMMUNICATION SYSTEM, ROAD-TO-VEHICLE COMMUNICATION METHOD, ROAD-TO-VEHICLE COMMUNICATION PROGRAM AND PROGRAM RECORDING MEDIUM

(75) Inventor: Kazuhiro Yanase, Tokyo (JP)

(73) Assignee: NEC Corporation, Tokyo (JP)

( * ) Notice: Subject to any disclaimer, the term of this patent is extended or adjusted under 35 U.S.C. 154(b) by 334 days.

(21) Appl. No.: 12/210,707

(22) Filed: Sep. 15, 2008

(65) Prior Publication Data

US 2009/0072998 A1 Mar. 19, 2009

(30) Foreign Application Priority Data

Sep. 14, 2007 (JP) ................................ 2007-238955

(51) Int. Cl.
*B60Q 1/00* (2006.01)

(52) U.S. Cl. .................... 340/905; 340/995.26; 340/435

(58) Field of Classification Search .................. 340/905, 340/988, 435, 436, 937, 939, 903, 990, 991, 340/995.1, 995.12, 995.13, 995.26, 995.27, 340/901

See application file for complete search history.

(56) References Cited

U.S. PATENT DOCUMENTS

| | | | | |
|---|---|---|---|---|
| 5,666,109 | A * | 9/1997 | Fukui et al. | 340/905 |
| 6,300,882 | B1 * | 10/2001 | Inoue | 340/933 |
| 6,628,210 | B2 * | 9/2003 | Lee | 340/988 |
| 7,133,768 | B2 * | 11/2006 | Mukaiyama | 701/200 |
| 7,342,509 | B2 * | 3/2008 | Tauchi | 340/905 |
| 2004/0145495 | A1 * | 7/2004 | Komada et al. | 340/905 |
| 2006/0290503 | A1 * | 12/2006 | Sumida et al. | 340/572.1 |
| 2007/0182588 | A1 | 8/2007 | Yanase | |

FOREIGN PATENT DOCUMENTS

| | | | |
|---|---|---|---|
| EP | 1089088 | A | 4/2001 |
| EP | 1681657 | A | 7/2006 |
| JP | 2002225619 | A | 8/2002 |

OTHER PUBLICATIONS

European Search Report for EP 08 16 4134 completed Jan. 22, 2009.
H. Morimoto et al., "AHS road-to-vehicle communication system", Intelligent Transportation Systems, 1999 IEEE/IEEJ/ JSAI International Conference on Tokyo, Japan Oct. 5-8, 1999, p. 327-334.
European Communication or EP08 164 134.2 dated Feb. 7, 2011.
A. Yokohama et al, "Implementation of Multi-Channel Modem for DSRC System on Signal Processing Platform for Software Defined Radio", IEICE Transactions on Communications, Communication Society, vol. E89-B, No. 12, Dec. 2006, pp. 3225-3232, XP001505241.

* cited by examiner

*Primary Examiner* — Daniel Previl

(57) ABSTRACT

Disclosed is a road-to-vehicle communication system to provide highly reliable road-to-vehicle communication services by use of a vehicle's car navigation system. The roadmap information for the car navigation system contains information to indicate if an area is a road-to-vehicle communication possible area, and information relating to the communication system of road-to-vehicle communication. When the car navigation system detects that the vehicle approaches the road-to-vehicle communication possible area by a predetermined distance, a vehicle system acquires the communication system of the roadside communication equipment from the roadmap information. And the road-to-vehicle communication equipment is set to the stand-by state of the acquired communication system. When the road-to-vehicle communication equipment receive radio wave from the roadside communication equipment, the road-to-vehicle communication equipment is released from the stand-by state and receives from the roadside communication equipment warning information to prevent the vehicle from possible traffic accident.

18 Claims, 11 Drawing Sheets

FIG. 4

| | ROAD-TO-VEHICLE COMMUNICATION | COMMUNICATION SYSTEM | FREQUENCY(kHz) | ID | SERVICE TYPE | ... |
|---|---|---|---|---|---|---|
| .... | .... | .... | .... | .... | .... | .... |
| CROSSING300 | 1 | A | 5800 | 10FD987A | WARNING | .... |
| CROSSING301 | 1 | B | 2400 | 10FD985B | WARNING | |
| CROSSING302 | 1 | B | 2400 | 10FF0001 | WARNING, INTERFERENCE CONTROL | |
| CROSSING303 | 0 | 0 | 0 | 00000000 | WARNING | |
| .... | .... | .... | .... | .... | .... | .... |

FIG. 8

| | ROAD-TO-VEHICLE COMMUNICATION | COMMUNICATION SYSTEM | FREQUENCY(kHz) | ID | SERVICE TYPE | ··· |
|---|---|---|---|---|---|---|
| ⋮ | ⋮ | ⋮ | ⋮ | ⋮ | ⋮ | ⋮ |
| CROSSING300 | 1 | A | 5800 | 10FD987A | WARNING | ⋮ |
| CROSSING301 | 1 | B | 2400 | 10FD985B | WARNING | ⋮ |
| CROSSING302 | 1 | B | 2400 | 10FF0001 | WARNING, INTERFERENCE CONTROL | ⋮ |
| CROSSING303 | 0 | B | 2400 | 10FAAF01 | WARNING | ⋮ |
| ⋮ | ⋮ | ⋮ | ⋮ | ⋮ | ⋮ | ⋮ |

FIG. 11

(A)

| | ROAD-TO-VEHICLE COMMUNICATION | COMMUNICATION SYSTEM | FREQUENCY (kHz) | ID | SERVICE TYPE | ... |
|---|---|---|---|---|---|---|
| ⋮ | ⋮ | ⋮ | ⋮ | ⋮ | ⋮ | ⋮ |
| CROSSING300 | 1 | A | 5800 | 10FD987A | WARNING | ⋮ |
| CROSSING301 | 1 | B | 2400 | 10FD985B | WARNING | |
| CROSSING302 | 1 | B | 2400 | 10FF0001 | WARNING, INTERFERENCE CONTROL | |
| CROSSING303 | 0 | 0 | 0 | 00000000 | : | |
| ⋮ | ⋮ | ⋮ | ⋮ | ⋮ | ⋮ | ⋮ |

(RENEWAL)

(B)

| | ROAD-TO-VEHICLE COMMUNICATION | COMMUNICATION SYSTEM | FREQUENCY (kHz) | ID | SERVICE TYPE | ... |
|---|---|---|---|---|---|---|
| ⋮ | ⋮ | ⋮ | ⋮ | ⋮ | ⋮ | ⋮ |
| CROSSING300 | 1 | A | 5800 | 10FD987A | WARNING | ⋮ |
| CROSSING301 | 1 | B | 2400 | 10FD985B | WARNING | |
| CROSSING302 | 1 | B | 2400 | 10FF0001 | WARNING, INTERFERENCE CONTROL | |
| CROSSING303 | 1 | A | 5800 | 10FD987B | WARNING | |
| ⋮ | ⋮ | ⋮ | ⋮ | ⋮ | ⋮ | ⋮ |

ROAD-TO-VEHICLE COMMUNICATION SYSTEM, ROAD-TO-VEHICLE COMMUNICATION METHOD, ROAD-TO-VEHICLE COMMUNICATION PROGRAM AND PROGRAM RECORDING MEDIUM

INCORPORATION BY REFERENCE

This invention is based upon and claims the benefits of priority from Japanese patent application no. 2007-238955, filed on Sep. 14, 2007, the disclosure of which is incorporated herein in its entirety by reference.

FIELD OF THE INVENTION

The present invention relates to a road-to-vehicle communication system, a road-to-vehicle communication method, a road-to-vehicle communication program and a program recording medium.

BACKGROUND OF THE INVENTION

A typical example of road-to-vehicle communication services are services to assist prevention of vehicle collision (i.e., traffic accident) at a crossing as disclosed, for example, in Japanese patent publication no. 2002-225619 entitled “Vehicle Drive Assisting System under Dark Environment”. This is a service to generate warning to pedestrians or drivers who drive vehicles in one direction toward a crossing under poor visible conditions when another vehicle approaches the crossing in another direction. It is to be noted that most conventional road-to-vehicle communication systems employ different communication systems or schemes in communication media and frequency such as VICS (Vehicle Information & Communication System), DSRC (Dedicated Short Range Communication) or the like depending upon locations (national roads, local roads, crossings, etc.).

In other words, when providing road-to-vehicle communication services, it is generally very difficult to provide services by applying the same communication systems at all roads and crossings from the beginning. It is therefore unavoidable that various kinds of communication systems for applying road-to-vehicle communication services are intermingled.

In case of various kinds of intermingled communication systems as described hereinabove, it is typical that each road-to-vehicle communication equipment should be equipped with all functions to cope with all communication systems (i.e., communication media and communication frequencies) for conventional as well as more recent communication systems and that all of the communication functions must be made in a stand-by state all the time, thereby wasting power. Moreover, if there are a large number of installed communication systems, it takes some time to switch them from a stand-by condition to an active condition. This means that activation of a proper communication function is too late for preventing a traffic accident or an anti-collision support service is not available unless the driver manually switches the communication frequencies.

SUMMARY OF THE INVENTION

In consideration of the aforementioned problems, it is an object of the present invention to provide road-to-vehicle communication services that are capable of overcoming or significantly improving such problems. For this end, information relating to the road-to-vehicle communication services is held in the widely used car navigation system together with its roadmap information and the stored information for the road-to-vehicle communication services in the roadmap information are read out in advance as one drives a vehicle on the road, thereby making effective use of the car navigation system and also making highly reliable road-to-vehicle communication services available to the user.

In other words, it is the object of the road-to-vehicle communication system, the road-to-vehicle communication method, the road-to-vehicle communication program and the program recording medium according to the present invention comprises means to store and send the particular communication systems for the areas where roadside communication equipment for roadside communication are installed at the roadsides together with the roadmap information in the car navigation system, means for performing roadside communication with the road-to-vehicle communication equipment by choosing and adjusting the communication system for the particular area, and means for providing the services for preventing a traffic accident by receiving the information from the roadside by way of the roadside communication means, thereby making effective use of the car navigation system and providing highly reliable road-to-vehicle communication services.

In order to solve the above problems and achieve the above objectives, the road-to-vehicle communication system according to the present invention comprises the following unique constructions.

(1) A road-to-vehicle communication system for performing communication between a road-to-vehicle communication equipment on a vehicle and a roadside communication equipment installed by a road characterized in that: roadmap information to be used by a car navigation system on the vehicle includes at least information to indicate whether the road is in an area where the roadside communication equipment is installed for enabling road-to-vehicle communication and communication system information to specify the particular communication system of the roadside communication equipment; and when detected that the vehicle approaches the road-to-vehicle communication possible area by a predetermined distance, the particular communication system of the roadside communication equipment that is installed in the road-to-vehicle communication area is acquired from the roadmap information, thereby switching the road-to-vehicle communication equipment to the communication settings of the particular communication system and setting to the stand-by state for receiving radio wave from the roadside communication equipment.

The road-to-vehicle communication system, the road-to-vehicle communication method, the road-to-vehicle communication program and the program recording medium according to the present invention exhibit the following practical advantages.

Firstly, the road-to-vehicle communication system can be set to the ready state for starting communication before entering the area where the road-to-vehicle communication is possible, thereby minimizing the communication waiting time and expanding the safety support areas for vehicle collision prevention support.

Secondly, the road-to-vehicle communication equipment having plural communication systems are not always set to their communicating states but the particular communication system for a communicating area is set to the stand-by state immediately before entering the area, thereby reducing the power consumption of the road-to-vehicle communication equipment.

Thirdly, if the actual road-to-vehicle communication system is different from the one stored in the roadmap information, the road-to-vehicle communication system in the roadmap information can be renewed, thereby improving reliability of the road-to-vehicle communication services available to the driver.

BRIEF DESCRIPTION OF THE DRAWINGS

Other features and advantages of the present invention will be best understood from the following descriptions made with reference to the accompanying drawings, wherein:

FIG. 4 is a table of the first embodiment of the roadmap information stored in a car navigation system;

FIG. 8 is a table of a second embodiment of the roadmap information stored in a car navigation system;

FIG. 11 is a table to show a third embodiment of the roadmap information stored in a car navigation system.

DETAILED DESCRIPTION OF EXEMPLARY EMBODIMENTS

Now, embodiments of the road-to-vehicle communication system, the road-to-vehicle communication method, the road-to-vehicle communication program and the program recording medium according to the present invention will be described in greater detail with reference to the accompanying drawings. Although the road-to-vehicle communication system and the road-to-vehicle communication method according to the present invention will be described hereunder, it is to be noted, however, that the road-to-vehicle communication method may be implemented as a road-to-vehicle communication program in a computer executable manner or the road-to-vehicle communication program may be recorded in a recording medium in a computer readable manner.

(Features of the Present Invention)

The present invention is a road-to-vehicle communication system as a part of the Intelligent Transport System (ITS) and is based upon the roadmap information of a car navigation system for enabling a vehicle entering an area to choose the communication system appropriate for the area before starting road-to-vehicle communication. In other words, the road-to-vehicle communication equipment is made to the stand-by state for starting road-to-vehicle communication in a particular communication system for the entering area in advance based upon the information from a car navigation system. In this way, it is possible to reduce power consumption of the road-to-vehicle communication equipment and reduce the waiting time for communication even if it is a type to switch communication systems, thereby effectively avoiding delay in generating a warning to prevent a traffic accident due to delayed start of road-to-vehicle communication.

1$^{st}$ Embodiment

Now, a first embodiment of the road-to-vehicle communication system according to the present invention will be described in greater detail with reference to the accompanying drawings.

(Configuration of 1$^{st}$ Embodiment)

Figure 1:
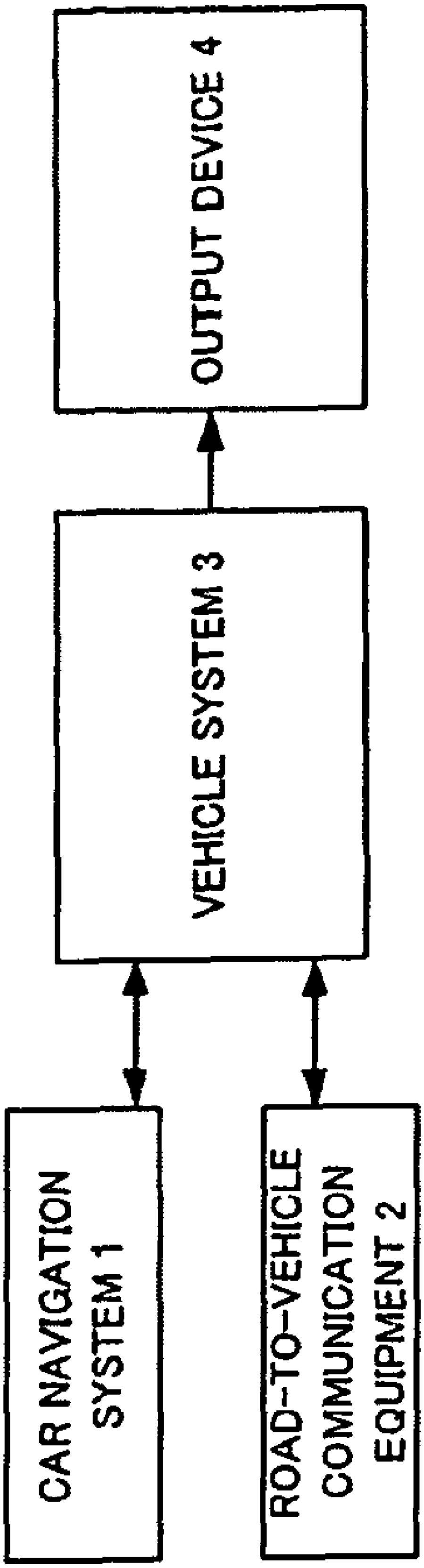
FIG. 1 is a system configuration of a first embodiment of the road-to-vehicle communication system according to the present invention.

The system configuration of the first embodiment of the road-to-vehicle communication system according to the present invention is illustrated in FIG. 1. The first embodiment of the road-to-vehicle communication system according to the present invention as illustrated in FIG. 1 comprises at least a car navigation system 1, a road-to-vehicle communication equipment 2, a vehicle system 3 and an output device 4.

The car navigation system 1 is equipped with a GPS (Global Positioning System) and roadmap information to act as a so-called vehicle route guiding system that provides a display of the current area of the vehicle, a route search, a route guide, etc. It is to be noted here that the roadmap information includes not only presence or absence of a traffic signal or the like for each crossing on the road but also presence or absence of road-to-vehicle communication services and the road-to-vehicle communication system (communication medium, communication frequency, etc.) for each crossing, if such roadside communication services are available. When detecting a vehicle that approaches a crossing, the car navigation system 1 reads out the stored information from the roadmap information about presence or absence of the road-to-vehicle communication services that may be available at the crossing and the applied road-to-vehicle communication system. And the read-out information is transferred to the vehicle system 3 that is installed on the vehicle. It is to be noted that the car navigation system 1 is also equipped with a function to renew the roadmap information in response to a command from the vehicle system 3.

The road-to-vehicle communication equipment 2 is a communication equipment on the vehicle to communicate with the roadside communication equipment. In other words, it communicates with the roadside communication equipment in response to a command from the vehicle system 3. If it failed to communicate with the roadside communication equipment in response to a communication initiation command from the vehicle system 3 due to different communication system or the like, a communication error is transmitted to the vehicle system 3 from which the command is sent. On the other hand, if the vehicle system 3 sends no command and if there is a roadside communication equipment that is capable of communicating with the road-to-vehicle communication equipment 2, a function is provided to transmit such information to the vehicle system 3.

The vehicle system 3 is an information processing device. It receives such information as approaching to a crossing, presence or absence of roadside communication capability, an applied road-to-vehicle communication system, if available, from the car navigation system 1. If it is unable to communicate with the roadside communication equipment at the crossing, an output command is sent out to the output device 4 for indicating that no road-to-vehicle communication is possible. On the other hand, if the road-to-vehicle communication with the roadside communication equipment is possible at the crossing, it sends to the road-to-vehicle communication equipment 2 information relating to the communication system with the roadside communication equipment together with a communication initiation command.

The vehicle system 3 sets itself to a stand-by state or sends an output command to the output device 4 based upon the information received from the roadside by way of the road-to-vehicle communication equipment 2. If failed to communicate with the roadside communication equipment despite the fact of receiving information on the road-to-vehicle communication system for an area from the car navigation system 1 after approaching the area, the vehicle system 3 sends instruction to the car navigation system 1 for correcting to the information representing a road-to-vehicle communication error for the area from the presence of road-to-vehicle communication services for the area.

On the other hand, if a communication with the road-to-vehicle communication equipment 2 is successfully made for an area despite the fact of not receiving information from the car navigation system 1 to approach a road-to-vehicle communication possible area, an instruction is sent to the car navigation system 1 for correcting the information to the road-to-vehicle communication possible area from the road-to-vehicle communication impossible area. Also sent is the information on the particular road-to-vehicle communication system.

The output device 4 is an output device such as a human-machine interface including a display, a speaker and the like. It outputs a warning display, a warning and the like upon receiving commands from the vehicle system 3.

(Operation of the 1$^{st}$ Embodiment)

Figure 2:
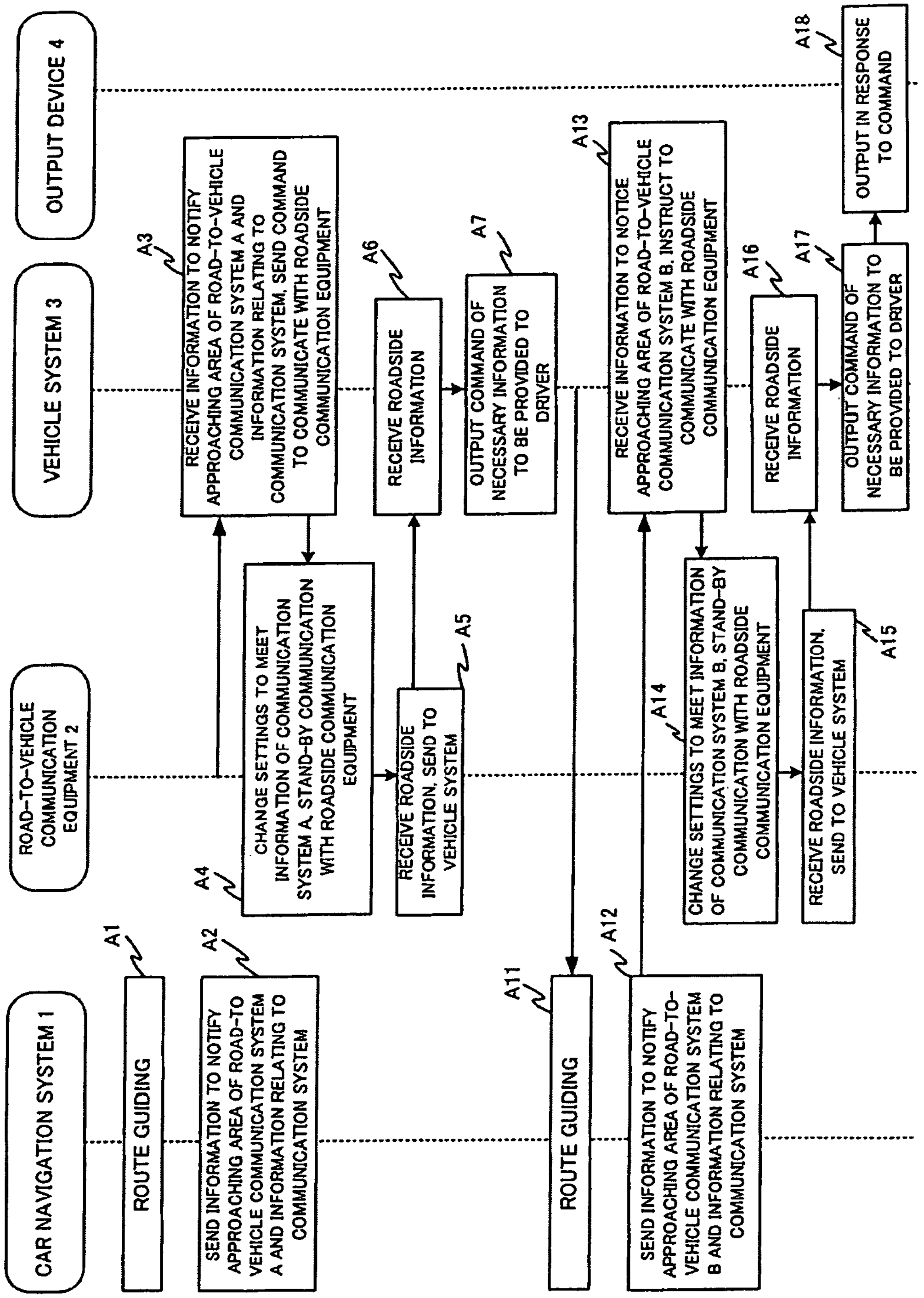
FIG. 2 is a sequence chart of the first embodiment to show the operation of the road-to-vehicle communication system when a vehicle approaches an area where the road-to-vehicle communication services are available.
Figure 3:
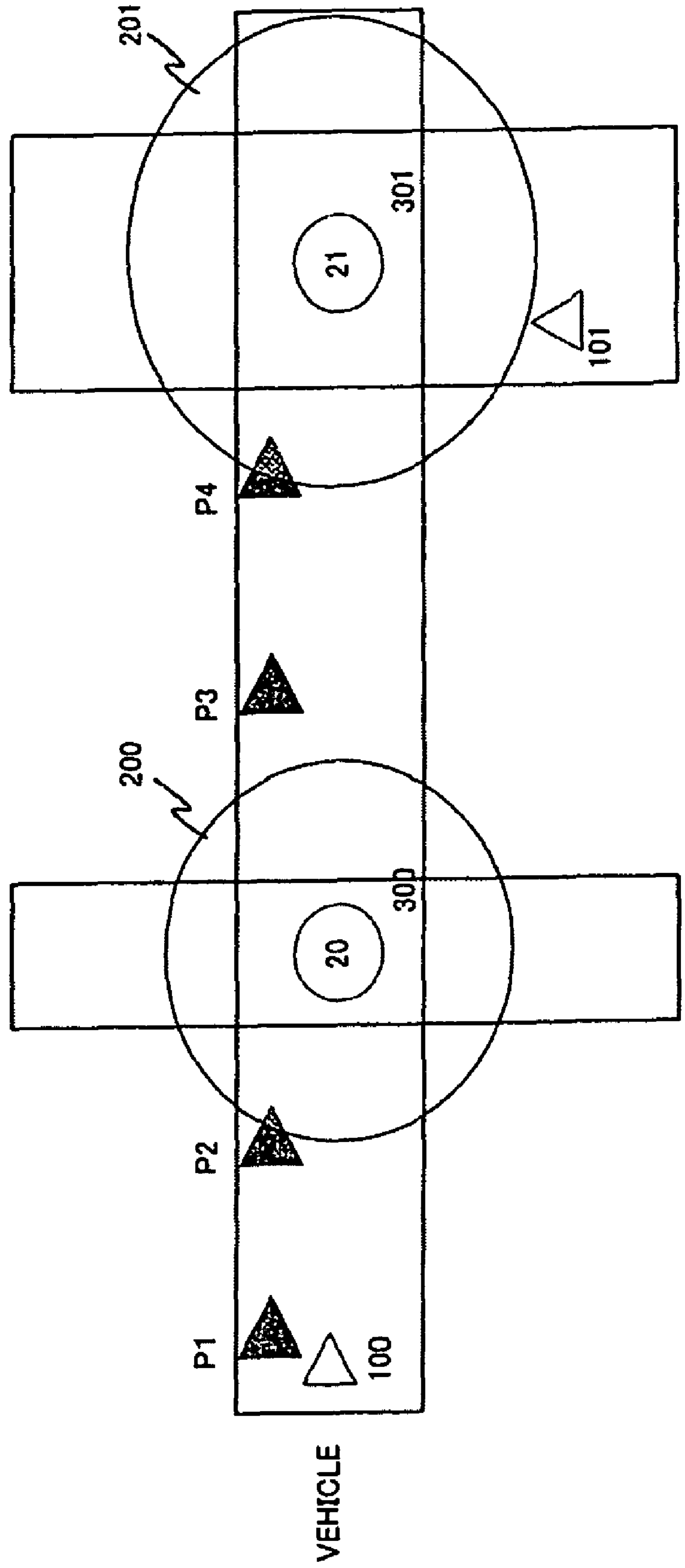
FIG. 3 is an illustration of the first embodiment when a vehicle approaches the area where the road-to-vehicle communication services are available.

Now, a detailed description of an exemplified operation of the first embodiment of the road-to-vehicle communication system as shown in FIG. 1 will be given hereunder with reference to the sequence chart in FIG. 2, the illustration in FIG. 3 and the table in FIG. 4. FIG. 2 is the sequence chart of one embodiment of the operation of the road-to-vehicle communication system to be carried out when a vehicle approaches a road-to-vehicle communication possible area, wherein the next approaching road-to-vehicle communication possible area employs a different road-to-vehicle communication system from the one at the previous area. FIG. 3 is an illustration to show how a vehicle approaches a road-to-vehicle communication possible area in the first embodiment. FIG. 4 is the table to show one embodiment of the roadmap information held in the car navigation system 1.

In the sequence chart as shown in FIG. 2, shown are a series of events to be sequentially carried out in each element, i.e., the car navigation system 1, the road-to-vehicle communication equipment 2, the vehicle system 3 and the output device 4 in the road-to-vehicle communication system as shown in FIG. 1.

It is assumed that the vehicle 100 runs along the route of point P1, point P2, point P3 and point P4 as illustrated in FIG. 3. It is to be noted that in a crossing 300 at the location of the point P2 the vehicle 100 enters an area 200 where the road-to-vehicle communication is possible by an roadside communication equipment 20 of the road-to-vehicle communication system A. On the other hand, in a crossing 301 at the area P4 the vehicle 100 enters an area 201 where the road-to-vehicle communication is possible by an roadside communication equipment 21 of the road-to-vehicle communication system B. It is assumed that another vehicle 101 is approaching the crossing 301 from another road crossing thereto.

Firstly, at the time when the vehicle 100 reaches the point P1 in front of the crossing 300 where the roadside communication equipment 20 is installed by a predetermined constant distance, a route guide or the current location of the vehicle 100 will be displayed on the display of the car navigation system 1 in accordance with the setting made by the driver in advance.

The roadmap information that is stored in the car navigation system 1 includes such information as exemplified in the roadmap information table in FIG. 4. FIG. 4 is an example including possibility/impossibility of road-to-vehicle communication with the roadside communication equipment installed at a crossing ("1" is displayed if possible, while displaying "0" if impossible), the road-to-vehicle communication system if it is possible, communication frequency of road-to-vehicle communication, ID (identifier) for identifying road-to-vehicle communication and service type for avoiding traffic accident.

The roadmap information table as shown in FIG. 4 is an example at the crossing 300 equipped with a roadside communication equipment (with ID: "10FD987A" H) of road-to-vehicle communication system A and 5800 kHz communication frequency with warning display and warning sound for services to avoid traffic accident. On the other hand, equipped at the crossing 301 is a roadside communication equipment (ID: 10FD985" H) of road-to-vehicle communication system B and 2400 kHz communication frequency with warning display and warning sound for services to avoid traffic accident.

In the sequence chart as shown in FIG. 2, it is assumed that the vehicle 100 is in the route guide state by the car navigation system 1 (sequence A1). When the vehicle 100 at the point P1 is detected to be approaching the crossing 300, the car navigation system 1 transmits to vehicle system 3 information notifying that the vehicle 100 approaches the crossing 300 in the area 200 of road-to-vehicle communication system A as well as information relating to the communication system A as shown in FIG. 4 (sequence A2).

When the vehicle system 3 receives from the car navigation system 1 information approaching the crossing 300 in the area 200 of road-to-vehicle communication system A and also relating to the communication system A, the vehicle system 3 sends to the road-to-vehicle communication equipment 2 information necessary for setting to the communication system A as well as a command to cause to the stand-by state for initiating communication with the roadside communication equipment 20 installed at the crossing 300 (sequence A3). Then, the road-to-vehicle communication equipment 2 is switched to the communication setting state corresponding to the information relating to the communication system A that is received from the vehicle system 3 (sequence A4).

Thereafter, when the vehicle 100 moves inside the area 200 of road-to-vehicle communication system A for the crossing 300 at the point P2 in immediate front of the crossing 300, the roadside communication equipment 20 starts communication with the road-to-vehicle communication equipment 2 for receiving information from the roadside communication equipment 20. The road-to-vehicle communication equipment 2 transmits to the vehicle system 3 the information received from the roadside communication equipment 20 (sequence A5). If there are no other vehicles or pedestrians approaching the crossing from another road that crosses the road along which the vehicle 100 is running at this moment, transmitted to the vehicle system 3 is information that there are no other approaching vehicles or no information.

The vehicle system 3 receives from the road-to-vehicle communication equipment 2 information indicating whether or not another vehicle or the like is approaching the crossing 300 from another road (sequence A6). Based on the received information indicating whether or not any vehicle or the like is approaching the crossing from another road, the vehicle system 3 makes a judgment if there is any information necessary to provide to the driver. If there is any necessary information, it sends to the output device 4 a command for causing to output such information that another vehicle is approaching the crossing from another road (sequence A7).

On the other hand, if there is no necessary information for providing to the driver at the crossing 300, i.e., there is no another vehicle approaching the crossing 300 from another road as is the case in this particular embodiment, the vehicle system 3 outputs no command to the output device 4.

Now, the vehicle 100 that passed the crossing 300 moves to the point P3 in front of the next crossing 301. During this time interval, the car navigation system 1 continues to provide the route guide services in accordance with the result of the preset route search by the driver or display the current location of the vehicle 100 (sequence A11). Upon detecting that the crossing 301 is approaching by the vehicle 100 at the point P3, the car navigation system 1 transmits to the vehicle system 3 information indicating that the vehicle 100 is approaching the crossing 301 in the area 201 of road-to-vehicle communication system B as well as the information relating to the communication system B as shown in FIG. 4 (sequence A12).

Upon receiving from the car navigation system 1 the information indicating that the vehicle 100 is approaching the crossing 301 in the area 201 of communication system B and the information relating to the communication system B, the vehicle system 3 outputs to the road-to-vehicle communication equipment 2 the information relating to the communication system B to be set together with a command for causing to switch to the stand-by state for starting to communicate with the roadside communication equipment 21 installed at the crossing 301 (sequence A13). The road-to-vehicle communication equipment 2 is switched to the communication settings corresponding to the information relating to the communication system B received from the vehicle system 3 and resumes the stand-by state for starting communication with the roadside communication equipment 21 (sequence A14).

Subsequently, when the vehicle 100 moves to the point P4 in front of the crossing 301 and enters the area 201 of roadside communication system B for the crossing 301, the road-to-vehicle communication equipment 2 starts communication with the roadside communication equipment 21 for receiving information therefrom. As described hereinabove, another vehicle 101 is approaching the crossing 301 from another road in this particular embodiment. As a result, such information is contained in the information from the roadside communication equipment 21. The roadside communication equipment 21 transmits the received information (indicating that another vehicle 101 is approaching) to the vehicle system 3 (sequence A15). It is to be noted that if there is no another vehicle or pedestrian approaching the crossing from another road, the vehicle system 3 transmits information indicating that there is no vehicle or pedestrian approaching from another road or transmits no information at all.

The vehicle system 3 receives from the road-to-vehicle communication equipment 2 the information indicating whether or not another vehicle or the like is approaching the crossing 301 from another road (sequence A16). Based upon the received information indicating whether or not another vehicle or the like is approaching from another road, the vehicle system 3 makes a judgment if there is any necessary information to provide to the driver. If there is any vehicle or the like approaching the crossing from another road, immediately transmitted to the output device 4 is a command to output to the driver the necessary information, e.g., the information indicating that another vehicle 101 is approaching the crossing 301 from another road as is the case in this particular embodiment (sequence A17).

On the other hand, if there is no necessary information to provide to the driver at the crossing 301, i.e., there is no approaching vehicle or the like from another road unlike the case in this particular embodiment, the vehicle system 3 outputs no command to the output device 4.

Upon receiving the output command from the vehicle system 3, the output device 4 provides a warning such as "another vehicle approaches from right at crossing ahead" on a display in order to warn the driver that another vehicle 101 is approaching the crossing 301 from another road. Preferably, a warning sound such as "Peep" is also outputted from a speaker in order to catch the driver's attention (sequence A18).

2$^{nd}$ Embodiment

Now, a second embodiment of the road-to-vehicle communication system according to the present invention will be described with reference to the accompanying drawings.

(Configuration of 2$^{nd}$ Embodiment)

Figure 5:
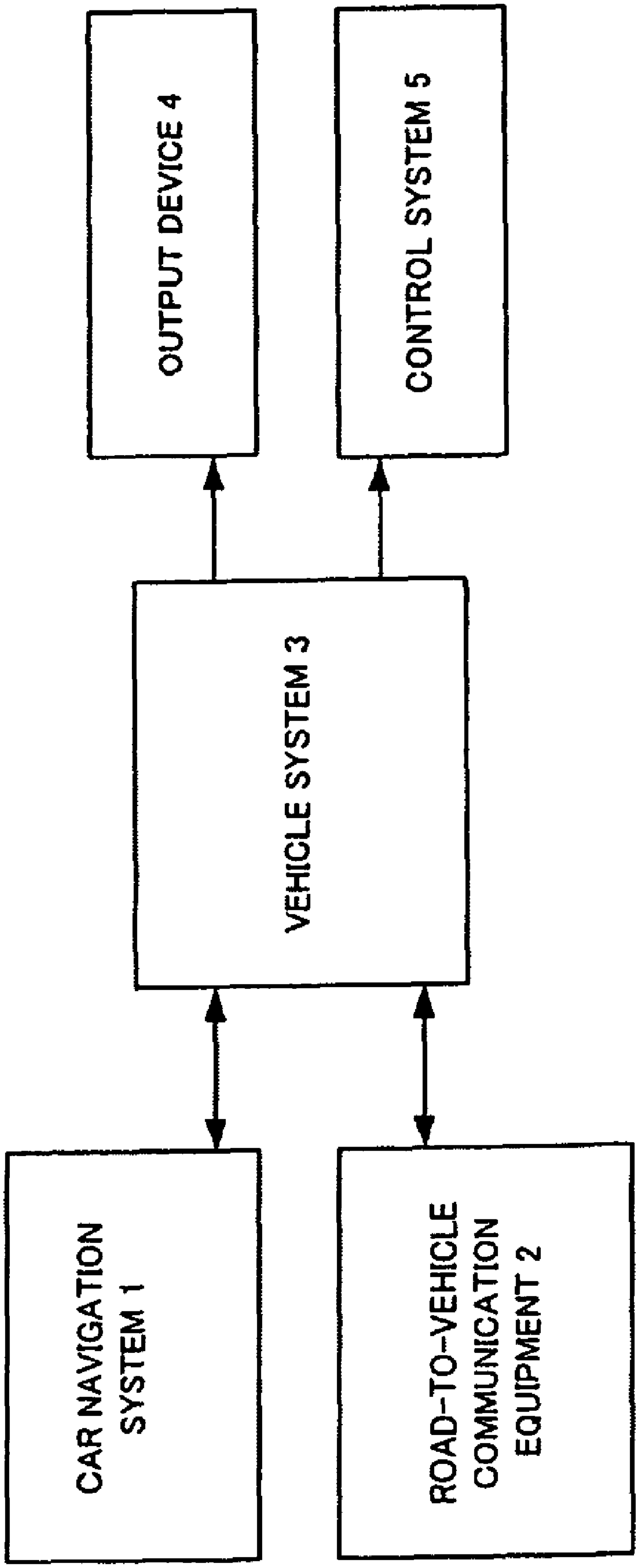
FIG. 5 is a block diagram to show a system configuration of a second embodiment of the road-to-vehicle communication system according to the present invention.

The second embodiment features in outputting to a control system (for example, engine, brake, etc.) depending upon areas. The system configuration of the second embodiment of the road-to-vehicle communication system according to the present invention is illustrated in block diagram in FIG. 5. With reference to FIG. 5, the road-to-vehicle communication system according to this embodiment comprises at least a car navigation system 1, a road-to-vehicle communication equipment 2, a vehicle system 3 and an output device 4 similar to the first embodiment. Additionally, it further comprises a control system 5.

Since the car navigation system 1, the road-to-vehicle communication equipment 2, the vehicle system 3 and the output device 4 are identical to those in the first embodiment, no further description will be made herein. The control system 5 controls the vehicle running conditions. For example, it provides controls on the engine, the brake and the like based upon commands from the vehicle system 3 as mentioned hereinabove. For example, if the vehicle system 3 makes a judgment of the need for immediately stop the vehicle in a certain area based upon information from the road-to-vehicle communication system 2, outputted to the control system 5 is a command to suddenly stop the vehicle. Upon receiving the command, the control system 5 interferes the vehicle control by giving priority over the driver's vehicle operations, for example, by immediately applying brake to the wheels and in validating driver's acceleration operation from the acceleration pedal.

(Operation of 2$^{nd}$ Embodiment)

Figure 6:
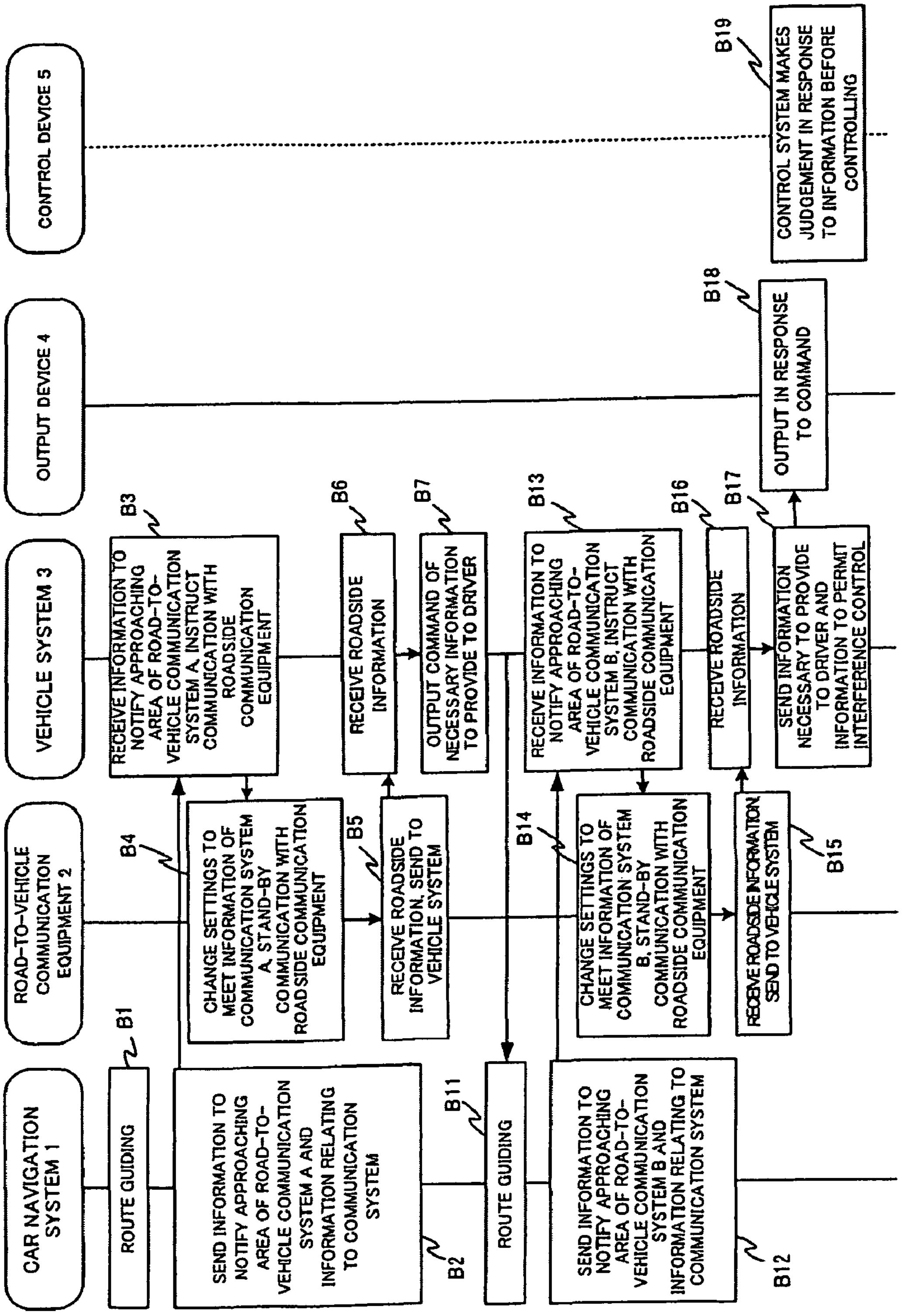
FIG. 6 is a sequence chart to show the operation of the second embodiment of the road-to-vehicle communication system when a vehicle approaches an area where the road-to-vehicle communication services are available.
Figure 7:
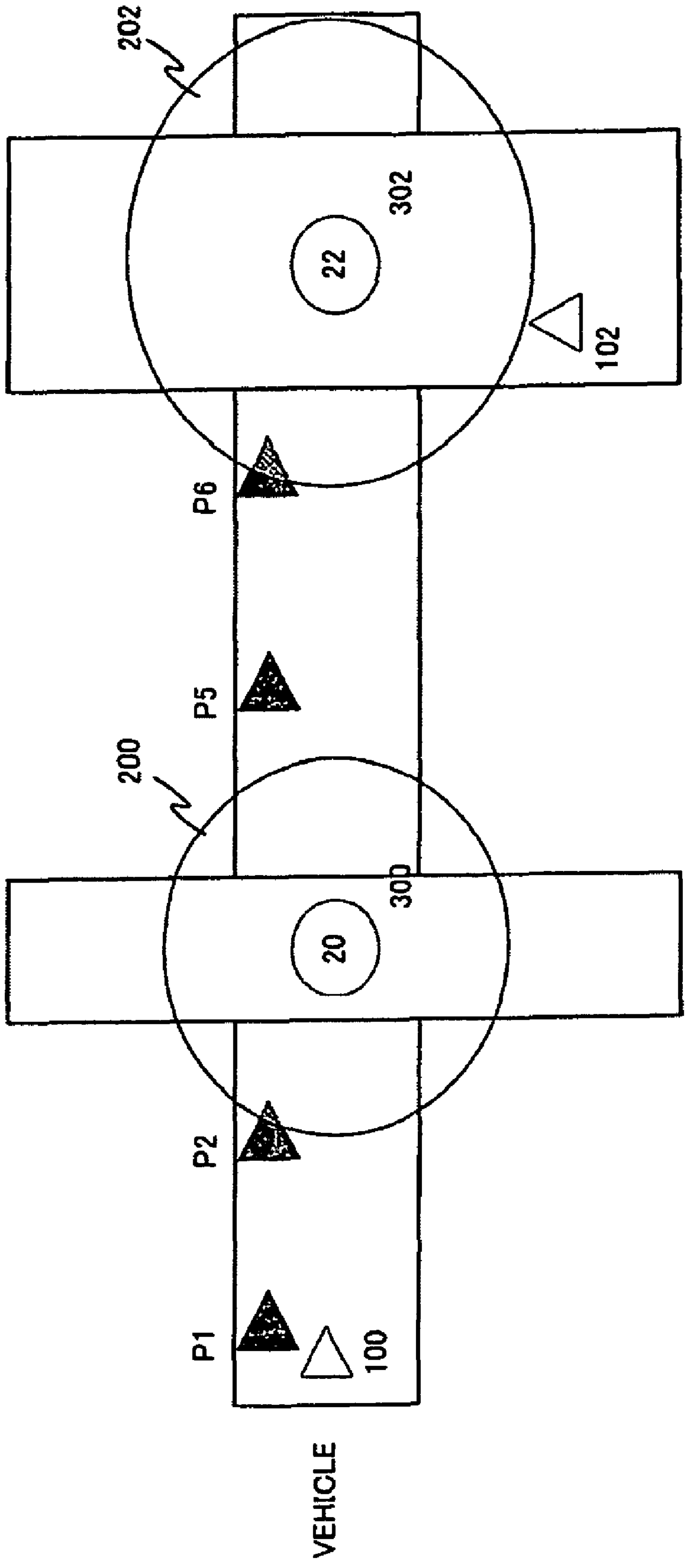
FIG. 7 illustrates the second embodiment when a vehicle approaches the road-to-vehicle communication area.

Now, an exemplified operation of the road-to-vehicle communication system of the second embodiment as shown in FIG. 5 will be described in greater details with reference to the sequence chart in FIG. 6, the illustration in FIG. 7 and the table in FIG. 8. FIG. 6 is the sequence chart to show the operation of the road-to-vehicle communication system to be applied when a vehicle approaches an area where road-to-vehicle communication is possible. That is, the next area employs a road-to vehicle communication system different from the one in the previous area and outputs a command to the control system 5 as its service type. FIG. 7 is an illustration to show how the vehicle approaches road-to-vehicle communication areas in the second embodiment. FIG. 8 shows the table of the roadmap information held in the car navigation system 1 in the second embodiment.

The sequence chart as shown in FIG. 6 sequentially shows a series of events to be carried out in each constituent element of the road-to-vehicle communication system as shown in FIG. 5, i.e., the car navigation system 1, the road-to-vehicle communication equipment 2, the vehicle system 3, the output device 4 and the control system 5.

It is assumed that the vehicle 100 runs through the path of point P1, point P2, point P3, point P4, point P5 and point P6 in this order. It is to be noted that the vehicle 100 enters at the point P2 an area 200 of road-to-vehicle communication system A where road-to-vehicle communication is possible in the road-to-vehicle communication system A by the roadside communication equipment 20 installed at the crossing 300. On the other hand, at the point P6, the vehicle enters an area 202 of road-to-vehicle communication system B where road-to-vehicle communication is possible in the road-to-vehicle communication system B by the roadside communication equipment 22 installed at the crossing 302. It is to be noted herein that another vehicle 102 approaches the crossing 302 from another road.

Firstly, at the time when the vehicle 100 passes through the point P1, the car navigation system 1 provides the route guide or displays the current location of the vehicle 100 on the display screen depending upon the result of route search preset by the driver.

The roadmap information in the car navigation system 1 contains the road map information table as exemplified in FIG. 8. Similar to the case in FIG. 4, contained in the exemplified table in FIG. 8 are possible/impossible of road-to-vehicle communication with the roadside communication equipment installed at the crossing ("1" is displayed if possible, while "0" is displayed if impossible) and the type of road-to-vehicle communication, communication frequency of road-to-vehicle communication, an ID (identifier) for identifying the roadside communication equipment and service type for avoiding traffic accident if the road-to-vehicle communication is possible.

However, the exemplified roadmap information table in FIG. 8 shows that the roadside communication equipment (ID: "10FD987A" H) capable of performing road-to-vehicle communication in the road-to-vehicle communication system A, 5800 kHz communication frequency and warning display and warning sound as the service for avoiding traffic accident is installed at the crossing 300 similar to the case in FIG. 4. On the other hand, installed at the crossing 302 is the road-to-vehicle communication equipment 2 (ID: 10FF0001" H) capable of performing road-to-vehicle communication in road-to-vehicle communication system B, 2400 kHz communication frequency, warning display and warning sound as the service for avoiding traffic accident in addition to automatic sending a command to the control system 5 for the interference control.

In the sequence chart as shown in FIG. 6, the vehicle 100 is set to the route guide state by the car navigation system 1 (sequence B1). When it is detected that the vehicle 100 passing through the current point P1 approaches the crossing 300, the car navigation system 1 sends to the vehicle system 3 information indicating that the crossing 300 in the area 200 of the road-to-vehicle communication system A is approaching as well as the information relating to the communication system A as shown in FIG. 8 similar to the case in FIG. 2 (sequence B2).

Upon receiving from the car navigation system 1 the information notifying that the crossing 300 in the area 200 of road-to-vehicle communication system A is approaching as well as the information relating to the communication system A, the vehicle system 3 sends to the road-to-vehicle communication equipment 2 the information relating to the communication system A to be set and a command to set to the stand-by state to start communication with the roadside communication equipment 20 installed at the crossing 300 similar to the case in FIG. 2 (sequence B3). Again similar to the case in FIG. 2, the road-to-vehicle communication equipment 2 changes the settings corresponding to the information relating to the communication system A as received from the vehicle system 3 and sets to the stand-by state for starting communication with the roadside communication equipment 20 (sequence B4).

Subsequently, when the vehicle 100 moves to the point P2 in immediate front of crossing 300, the road-to-vehicle communication equipment 2 starts communication with the roadside communication equipment 20 and receives the information therefrom similar to the case in FIG. 2. Then, the road-to-vehicle communication equipment 2 sends the information received from the roadside communication equipment 20 to the vehicle system 3 (sequence B5). If there is no another vehicle or pedestrian approaching the crossing 300 from another road through which the vehicle 100 is running, transmitted to the vehicle system 3 is the information indicating no vehicle or the like approaching thereto or no information is sent.

Similar to the case in FIG. 2, the vehicle system 3 receives from the road-to-vehicle communication equipment 2 information that indicates whether or not another vehicle or the like approaches the crossing 300 from another road (sequence B6). Also similar to the case in FIG. 2, the vehicle system 3 makes a judgment if there is any information necessary for providing to the driver based upon the received information indicating if there is another vehicle or the like approaching the crossing from another road. If there is any necessary information, a command is sent to the output device 4 for outputting such information that indicates, for example, approach of another vehicle from another road (sequence B7).

On the other hand, if there is no information to provide to the driver at the crossing 300, for example, if there is no another vehicle or the like approaching the crossing from another road, the vehicle system 3 does not send any command to the output device 4.

Consequently, the vehicle 100 that passed through the crossing 300 moves to the point P5 in front of the crossing 302. During this time period, the car navigation system 1 is assumed to provide the route guide or display the current location of the vehicle 100 depending upon the presetting by the driver similar to the case in FIG. 2 (sequence B11). Upon detecting of the vehicle 100 that has reached the point P5 approaches the crossing 302, the car navigation system 1 transmits to the vehicle system 3 the information indicating the approach to the area 202 of road-to-vehicle communication system B at the crossing 302 together with the information relating to the communication system B as shown in FIG. 8 similar to the case in FIG. 2 (sequence B12).

Similar to the case in FIG. 2, upon receiving from the car navigation system 1 the information indicating approach to the crossing 302 in the area 202 of road-to-vehicle communication system B together with the information relating to the communication system B, the vehicle system 3 sends to the road-to-vehicle communication equipment 2 the information relating to the communication system B to be set and to cause it to resume the stand-by state for starting communication with the roadside communication equipment 22 installed at the crossing 302 (sequence B13). Similar to the case in FIG. 2, the road-to-vehicle communication equipment 2 is switched the communication setting corresponding to the information relating to the communication system B that is received from the vehicle system 3 and resumes the stand-by state for starting communication with the roadside communication equipment 22 (sequence B14).

Thereafter, the vehicle 100 moves to the point P6 in front of the crossing 302 and enters the area 202 of road-to-vehicle communication system B at the crossing 302. Similar to the case in FIG. 2, the road-to-vehicle communication equipment 2 starts communication with the roadside communication equipment 22 for receiving the information therefrom. As described hereinabove, since another vehicle 102 is approaching the crossing 302 from another road in this particular embodiment, the information from the roadside communication equipment 22 contains additional information to indicate the fact. Again, similar to the case in FIG. 2, the road-to-vehicle communication equipment 2 sends the information received from the roadside communication equipment 22 (i.e., the additional information indicating that another vehicle 102 is approaching) to the vehicle system 3 (sequence B15). On the other hand, if there is no another vehicle or pedestrian approaching the crossing 302 from another road that crosses the road along which the vehicle 100 is running, transmitted to the vehicle system 3 is information indicating that no vehicle or the like is approaching from another road or no information is transmitted.

Similar to the case in FIG. 2, the vehicle system 3 receive from the road-to-vehicle communication equipment 2 information indicating whether or not there is any vehicle or pedestrian approaching the crossing 302 through another road (sequence B16) Again, similar to the case in FIG. 2, the vehicle system 3 makes a judgment if there is any information necessary to provide to the driver based upon the received information indicating if there is any vehicle or the like approaching from another road. If it is determined that there is information necessary to provide to the driver, a command is immediately transmitted to the output device 4 to output information necessary to provide to the driver, for example, the information indicating that another vehicle 102 is approaching the crossing 302 from another road as is the case in this particular embodiment (sequence B17).

Moreover, in case of the crossing 302 with the settings of not only "warning" but also "interference control" as shown in FIG. 8, operations are different from the case in FIG. 2. That is, depending upon locations and speeds of the vehicles 100 and 102, transmitted to the control system 5 is information indicating that the control system 5 is able to perform the interference control. On the other hand, different from the particular embodiment, if there is no information necessary to provide to the driver, e.g., there is no vehicle or the like approaching the crossing 302, the vehicle system 3 sends no command to the output device 4 and also no information to the control system 5.

Similar to the case in FIG. 2, upon receiving the output command from the vehicle system 3, the output device 4 provides a warning display "another car is approaching from right at next crossing" on the display as a warning to the driver about another vehicle 102 that approaches the crossing 302 from another road in response to the received output command. Additionally, a warning sound "Peep" may also be outputted from the speaker in order to alert the driver (sequence B18).

Furthermore, the control system 5 considers the location and speed of the vehicle 100 based upon the information that indicates possibility of the interference control and running conditions of another vehicle 102 from the vehicle system 3, thereby enabling the interference control by overriding driver's vehicle controls, i.e., by applying automatic brake or automatically invalidating driver's stepping on the gas pedal (sequence B19).

3rd Embodiment

Now, a third embodiment of the road-to-vehicle communication system according to the present invention will be described in detail with reference to the accompanying drawings.

The third embodiment is an example of the road-to-vehicle communication system having the configuration as shown in FIG. 1 but capable of modifying or renewing the road-to-vehicle communication system in the roadmap information in case where the road-to-vehicle communication system in a certain area as contained in the roadmap information in the car navigation system 1 differs from the actual road-to-vehicle communication system in the area. It is to be noted that the system configuration of the road-to-vehicle communication system may or may not include the control system 5.

(Operation of 3rd Embodiment)

Figure 9:
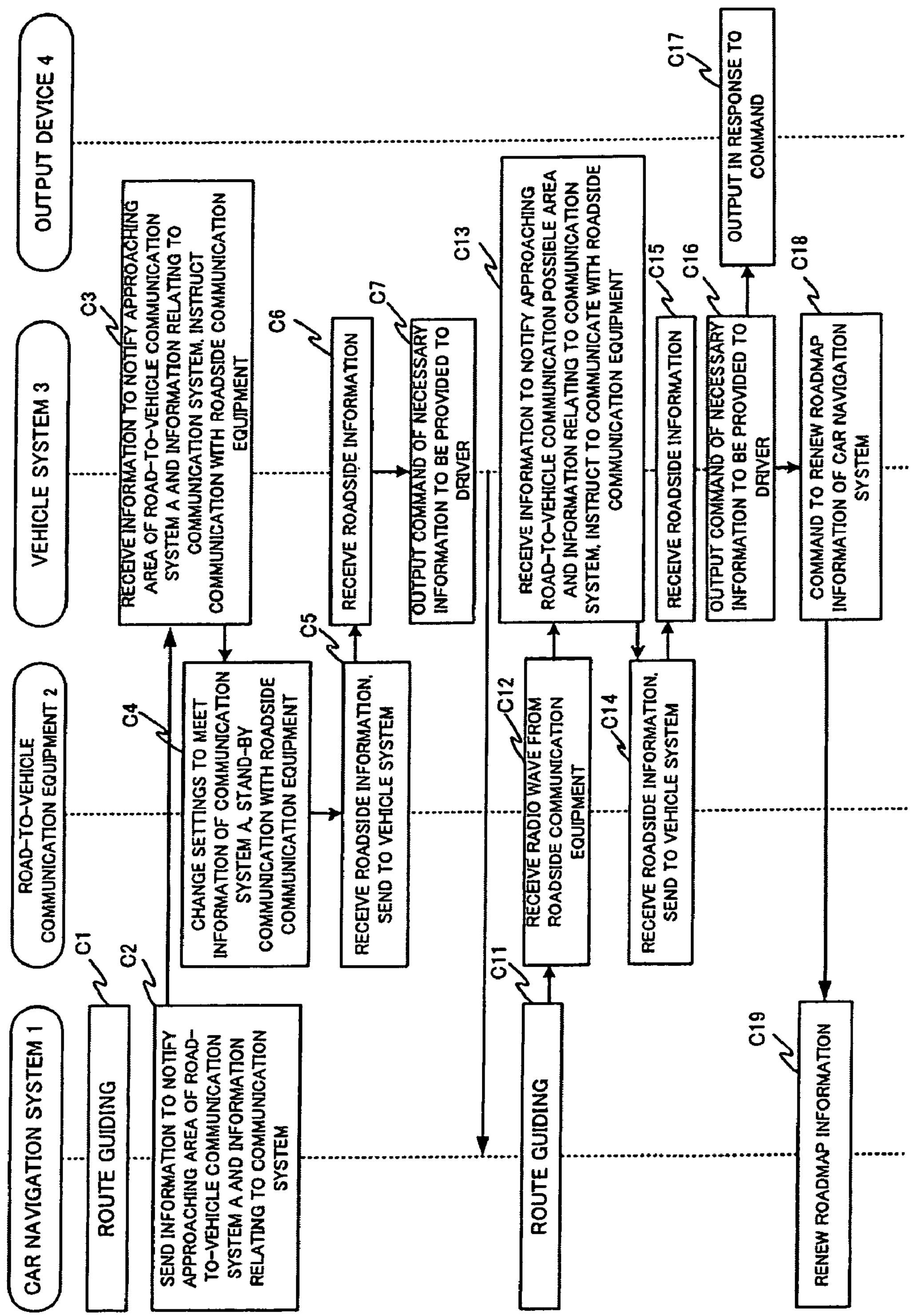
FIG. 9 is a sequence chart of a third embodiment to show the road-to-vehicle communication system operation when a vehicle approaches the road-to-vehicle communication area.
Figure 10:
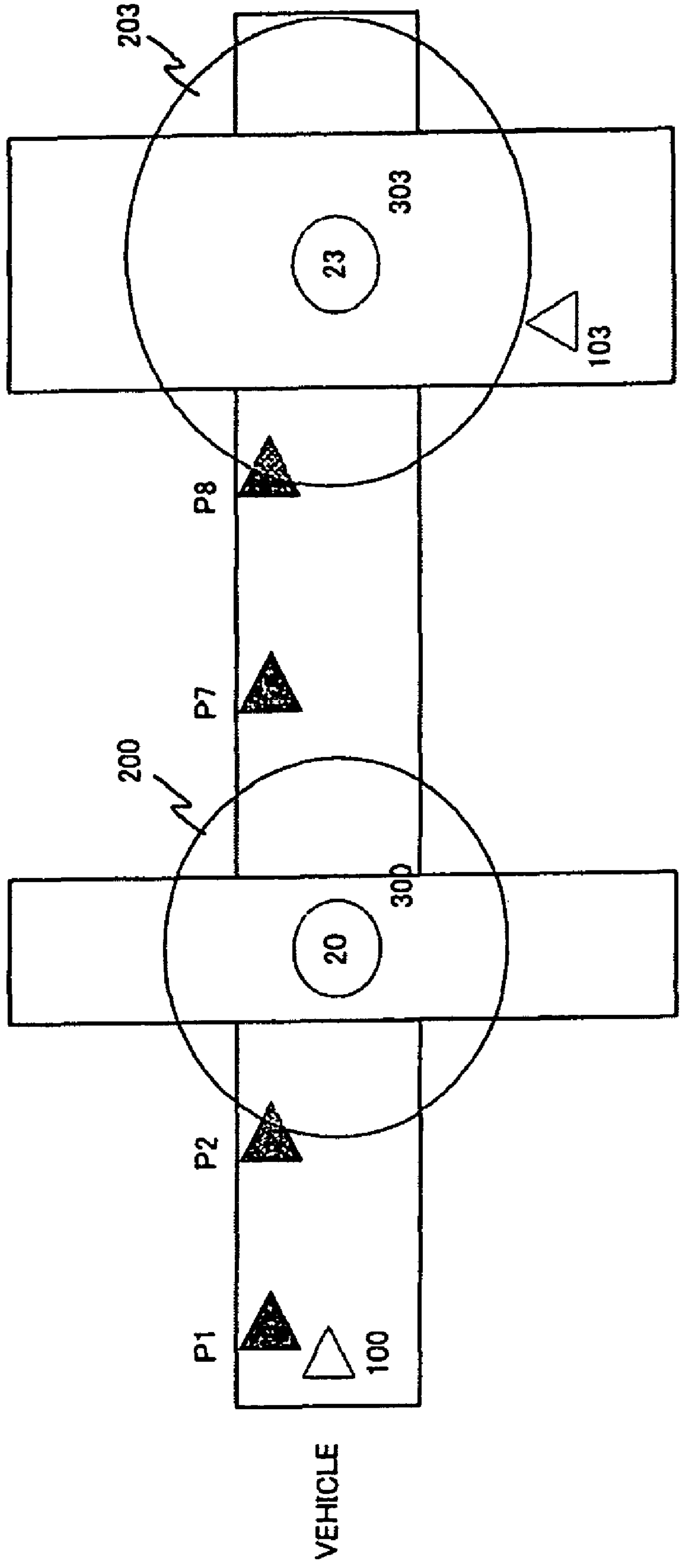
FIG. 10 illustrates the third embodiment when approaching the road-to-vehicle communication area.

Now, an exemplified operation of the road-to-vehicle communication system of the first embodiment as shown in FIG. 1 will be described in greater details with reference to the sequence chart in FIG. 9, the illustration in FIG. 10 and the table in FIG. 11. FIG. 9 is the sequence chart to show the operation of the third embodiment of the road-to-vehicle communication system to be applied when a vehicle approaches an area in which the road-to-vehicle communication is possible. Different from the case in FIG. 2, the next area where the vehicle approaches is held in the roadmap information in the car navigation system 1 as an area where road-to-vehicle communication is impossible, but it is found that road-to-vehicle communication is actually possible. FIG. 10 illustrates how vehicles approach the area where road-to-vehicle communication is possible in the third embodiment of the present invention. FIG. 11 is an exemplified table of the roadmap information held in the car navigation system 1 of the third embodiment.

In the sequence chart in FIG. 9, a series of events to be performed in each of the constituent element, i.e., the car navigation system 1, the road-to-vehicle communication equipment 2, the vehicle system 3 and the output system 4 are sequentially shown similar to the case in FIG. 2.

Also, as illustrated in FIG. 10, it is assumed that the vehicle 100 runs along the point P1, P2, P7 and P8 in this order. At the point P2, the vehicle 100 enters the area 200 of road-to-vehicle communication system A, wherein road-to-vehicle communication is possible by the roadside communication equipment 20 installed at the crossing 300. On the other hand, at the point P8, the vehicle 100 enters the area 203 of road-to-vehicle communication system A, wherein road-to-vehicle communication is actually possible by the roadside communication equipment 23 of road-to-vehicle communication system A installed at the crossing 303 despite registration of road-to-vehicle communication impossible crossing. It is also assumed that another vehicle 103 is approaching the crossing 303 from another crossing road.

Firstly, similar to the case in the first embodiment, at the time when the vehicle 100 passes through the point P1, the vehicle 100 is displaying on the display screen of the car navigation system 1 the route guide or the current location of the vehicle 100 based on the route search result preset in advance by the driver.

The roadmap information in the car navigation system 1 includes such information as exemplified in the roadmap information table in FIG. 11. Similar to the case in FIG. 4, shown in FIG. 11 is whether road-to-vehicle communication with the roadside communication equipment installed at the crossing is possible or impossible ("1" is displayed if possible, while "0" is displayed if impossible), the road-to-vehicle communication system, the communication frequency of road-to-vehicle communication, the identifier (ID) of the roadside communication equipment and the service type for avoiding traffic accident if the road-to-vehicle communication is possible.

As shown in the exemplified roadmap information table as shown in FIG. 11, although the crossing 300 is registered to be road-to-vehicle communication possible crossing installed with the roadside communication equipment (ID: "10FD987A" H) of the road-to-vehicle communication system A at 5800 kHz communication frequency with a warning display and a warning sound for avoiding traffic accident similar to the case in FIG. 4, the crossing 303 is registered as a road-to-vehicle communication impossible crossing, thereby not registering any road-to-vehicle communication system, communication frequency, ID and service type as shown in FIG. 11 (A). However, in fact, the crossing 303 is installed with the roadside communication equipment (ID: "10FD987B" H) capable of road-to-vehicle communication by the road-to-vehicle communication system A at 5800 kHz similar to the crossing 300 as shown in FIG. 11 (B).

In the sequence chart as shown in FIG. 9, it is assumed that the vehicle 100 is set to the route guide by the car navigation system 1 (sequence C1). Similar to the case in FIG. 2, upon detection of the vehicle 100 at the current point P1 is approaching the crossing 300, the car navigation system 1 sends to the vehicle system 3 information indicating that the vehicle 100 is approaching the area 200 of road-to-vehicle communication system A at the crossing 300 together with the information relating to the communication system A as shown in FIG. 11 (sequence C2).

Similar to the case in FIG. 2, when the vehicle system 3 receives from the car navigation system 1 the information indicating that the vehicle 100 is approaching the area 200 of road-to-vehicle communication system A at the crossing 300 together with the information relating to the communication system A, it sends a command to the road-to-vehicle communication equipment 2 the information to set to the communication system A and to resume the stand-by state to start communication with the roadside communication equipment 20 installed at the crossing 300 (sequence C3). Then, similar to the case in FIG. 2, the road-to-vehicle communication equipment 2 is switched to the settings corresponding to the information of the communication system A as received from the vehicle system 3 and resumes the stand-by state for starting communication with the roadside communication equipment 20 (sequence C4).

Thereafter, when the vehicle 100 moves to the point P2 in front of the crossing 300 and enters the area 200 of road-to-vehicle communication system A at the crossing 300, the road-to-vehicle communication equipment 2 starts communication with the roadside communication equipment 20 and receives information therefrom similar to the case in FIG. 2. The road-to-vehicle communication equipment 2 sends the information received from the roadside communication equipment 20 to the vehicle system 3 (sequence C5). If there is no another vehicle or pedestrian approaching the crossing from another road crossing the road along which the vehicle runs at this moment, information indicating that no another vehicle or pedestrian approaching the crossing is in the crossing road is sent to the vehicle system 3 or no information is sent thereto.

Again, similar to the case in FIG. 2, the vehicle system 3 receives from the road-to-vehicle communication equipment 2 the information indicating whether or not there is any vehicle or the like approaching the crossing 300 from another road (sequence C6) Similar to the case in FIG. 2, the vehicle system 3 makes a judgment if there is any information necessary to provide to the driver based upon the received information indicating whether or not any vehicle or the like is approaching from another road. If there is any necessary information, the vehicle system 3 sends an output command to the output device 4 so that the necessary information, for example information indicating that another vehicle or the like is approaching from another road is displayed (sequence C7).

On the other hand, if there is no information necessary to provide to the driver, i.e., there is no another vehicle or the like approaching the crossing 300 from another road as is the case in this embodiment, the vehicle system 3 sends no output command to the output device 4.

Subsequently, the vehicle 100 that passes through the crossing 300 reaches the point P7 in front of the crossing 303. Similar to the case in FIG. 2, the car navigation system 1 displays during this time period the route guide or the current location of the vehicle 100 based upon the result of route search preset in advance by the driver (sequence C11). Unlike the case in FIG. 2, no information relating to the communication system of road-to-vehicle communication is sent to the vehicle system 3 at the time when it is detected that the vehicle 100 at the point P5 is approaching the crossing 300 because the crossing 303 is registered in the car navigation system 1 as the one where road-to-vehicle communication is impossible as indicated in FIG. 11 (A). Accordingly, different from the case in FIG. 2, the vehicle system 3 does not sends a command to the road-to-vehicle communication equipment 2 to switch the communication system setting and resume the stand-by state.

Thereafter, the vehicle 100 moves to the point P8 in front of the crossing 303 and actually enters the area 203 of road-to-vehicle communication system A where the road-to-vehicle communication equipment 2 catches radio wave transmitted from the roadside communication equipment 23, thereby sending to the vehicle system 3 information notifying entrance to the road-to-vehicle communication possible area, i.e., the existence of the roadside communication equipment 23 (sequence C12). It is to be noted that the road-to-vehicle communication equipment 2 is unable to identify the road-to-vehicle communication system of the roadside communication equipment 2, thereby sending to the vehicle system 3 only the fact of reaching the road-to-vehicle communication possible area and existence of the roadside communication equipment 23.

The vehicle system 3 enters the area 203 of road-to-vehicle communication system A at the crossing 303 and catches the radio wave from the road-to-vehicle communication equipment 2 and receives the information indicating entrance to the road-to-vehicle communication possible area, thereby recognizing the installation of the roadside communication equipment 23 of unknown road-to-vehicle communication system at the crossing 303 different from the roadmap information in the car navigation system 1. In order to investigate the road-to-vehicle communication system of the roadside communication equipment 23 installed at the crossing 303, the vehicle system 3 sends communication commands to the road-to-vehicle communication equipment 2 while sequentially switching communication settings (sequence C13). As a result, the road-to-vehicle communication equipment 2 successfully detects the road-to-vehicle communication system of the roadside communication equipment 23. However, if attempts of communication with the roadside communication equipment 23 by the road-to-vehicle communication equipment 2 with sequentially switched communication settings resulted in failure and could not detect the communication system of the roadside communication equipment 23, it does not proceed to the communication start phase and terminates further operations.

On the other hand, there is a possibility when the road-to-vehicle communication system as registered in the roadmap information in the car navigation system 1 is different from the actual road-to-vehicle communication system, thereby enabling the road-to-vehicle communication equipment 2 to catch radio wave transmitted from the roadside communication equipment 23 but disabling to communicate by the road-to-vehicle communication system as registered in the roadmap information. In this case, the road-to-vehicle communication equipment 2 follows communication instructions from the vehicle system 3 and attempts to communicate with the roadside communication equipment 23 while sequentially switching the communication settings.

At the time of sequence C12, it is possible that, for example, the road-to-vehicle communication equipment 2 does not change the communication system settings by the vehicle system 3. When it reaches the point P8 where road-to-vehicle communication is possible while receiving no command to set to the stand-by state (i.e., no command to set to the stand-by state is received when the vehicle 100 reached the point P7 in front of the crossing 303), the current communication settings (communication system and communication frequency) of road-to-vehicle communication system A may be used to attempt communication with the roadside communication equipment 23.

If it is successful in communication with the roadside communication equipment 23 by attempting communication with the currently set road-to-vehicle communication system A in the above manner, the road-to-vehicle communication equipment 2 sends to the vehicle system 3 information indicating entrance to the area 203 of road-to-vehicle communication system A at the crossing 303 together with the information relating to the communication system A instead of sending information notifying the entrance to the road-to-vehicle communication possible area. In this case, the vehicle system 3 recognizes that the crossing 303 is a road-to-vehicle communication possible area as the area 203 of road-to-vehicle communication system A employing the roadside communication equipment 23 of communication system A. It is possible to sends command to immediately start communication with the roadside communication equipment 23 of road-to-vehicle communication system A that is installed at the crossing 303 without the need for sequential switching of communication settings of the road-to-vehicle communication equipment 2.

In this particular embodiment, when the road-to-vehicle communication equipment 2 succeeds in communication with the roadside communication equipment 23 using, for example, the communication system A, it starts communication with the roadside communication equipment 23 in the road-to-vehicle communication system A and receives information therefrom. As described hereinabove, since another vehicle 103 is approaching the crossing 303 from another road in this embodiment, the information from the roadside communication equipment 23 contains such additional information. Similar to the case in FIG. 2, the road-to-vehicle communication equipment 2 sends to the vehicle system 3 the information received from the roadside communication equipment 23 (i.e., the additional information indicating that another vehicle 103 is approaching) (sequence C14). If there is no another vehicle or pedestrian approaching the crossing 303 from another road crossing the road along which the vehicle 100 is traveling, the vehicle system 3 sends information indicating that no another vehicle or the like is approaching from another road or no information is sent.

Similar to the case in FIG. 2, the vehicle system 3 receives from the road-to-vehicle communication equipment 2 information indicating whether or not another vehicle or the like is approaching the crossing 303 (sequence C15). Again similar to the case in FIG. 2, the vehicle system 3 makes a judgment if there is any information necessary to provide to the driver based upon the received information indicating whether or not there is any another vehicle or the like from another road. If there is any vehicle or the like that approaches from another road, immediately sent to the output device 4 is an output command of the necessary information to the driver, for example, the information indicating that another vehicle 103 or the like is approaching from another road (sequence C16). On the other hand, if there is no information necessary to provide to the driver at the crossing 303, i.e., if no another vehicle or the like is approaching the crossing from another road unlike the case in this embodiment, the vehicle system 3 sends no output command to the output device 4.

Upon receiving the output command from the vehicle system 3, the output device 4 provides on the display a warning display "another vehicle is approaching next crossing from right direction" to alert the driver that another vehicle 103 is approaching the crossing 303 from the right direction and also outputs a warning sound "Peep" from a speaker in response to the received output command similar to the case in FIG. 2 (sequence C17).

Moreover, the vehicle system 3 sends a command to the car navigation system 1 for renewing the road-to-vehicle communication system for the crossing 303 from the road-to-vehicle communication impossible state as stored in the roadmap information to the road-to-vehicle communication possible state in the road-to-vehicle communication system A. (sequence C18). The car navigation system 1 renews the roadmap information for the crossing 303 as shown in FIG. 11 (A) and registers the information for the crossing as the area 203 where road-to-vehicle communication is possible in road-to-vehicle communication system A as shown in FIG. 11 (B) in accordance with the roadmap information renewal command from the vehicle system 3 (sequence C19).

Other Embodiments

Now, other embodiments of the road-to-vehicle communication system according to the present invention will be described.

If the actual road-to-vehicle communication system is different from the one in the roadmap information in the car navigation system 1 in the third embodiment, it is described that the road-to-vehicle communication equipment 2 makes communication attempts while sequentially changing communication settings in accordance with the communication command from the vehicle system 3. The present invention should not be restricted to such particular case. For example, renewal of the roadmap information may be carried out through a center server. That is, if actual conditions are different from what are contained in the roadmap information in availability of road-to-vehicle communication or road-to-vehicle communication system, and thus the road-to-vehicle communication equipment 2 is able to catch radio wave from the roadside communication equipment 23 but unable to perform road-to-vehicle communication, information pointing that the actual information on the road-to-vehicle communication is different from one in the roadmap information is first sent to the center server managing the roadmap information. Then the center server continues to collect such information from various vehicles and sends roadmap information renewal instructions to each car navigation system 1 when the collected information reaches a preset certain level.

Although each of the above embodiments are described on an example of crossings as the road-to-vehicle communication areas, road-to-vehicle communication can be applied to other areas such as, for example, curved roads with poor visibility of vehicles traveling in the opposite directions, slippery roads due to icing, or the like, thereby providing warnings to drivers on such dangerous roads by the road-to-vehicle communication. If information about the road-to-vehicle communication is held at the curves and slippery roads, it is possible to provide a warning to drivers in the similar manner to the crossings.

Moreover, when the driver makes arbitrarily settings for the road-to-vehicle communication, it is possible that the driver chooses whether he/she is provided with the road-to-vehicle communication services.

(Advantages of the Invention)

As understood from the foregoing descriptions, each of the embodiments of the present invention exhibits the following practical advantages.

Firstly, since it is possible to set the road-to-vehicle communication system to the proper state for initiating road-to-vehicle communication before entering an area where the road-to-vehicle communication is possible, the communication waiting time can be minimized, thereby expanding the areas to provide safety services such as, for example, to prevent vehicle collision or the like.

Secondly, plural road-to-vehicle communication systems included within a road-to-vehicle communication equipment are not always energized to their standby states but only one of them that matches the particular road-to-vehicle communication system is made to the stand-by state immediately before entering the road-to-vehicle communication area, thereby reducing power consumption of the road-to-vehicle communication equipment.

Thirdly, if the actual road-to-vehicle communication system differs from the one held in the roadmap information, the road-to-vehicle communication system in the roadmap information can be renewed, thereby improving reliability of the road-to-vehicle communication services that are provided to drivers.

Preferred embodiments of the present invention have been described hereinabove. However, it is to be noted that these embodiments are simply examples of the present invention rather than for the purpose of restricting the present invention. It is understood for a person having an ordinary skill in the art that various modifications and alternations can be made without departing from the scope and spirit of the present invention. For example, the present invention may be implemented in the following configurations in addition to the particular or primary configuration (1) that is described hereinabove.

(2) A road-to-vehicle communication system of the above (1), wherein the road-to-vehicle communication equipment is released from the stand-by state for acquiring information from the roadside communication equipment by starting road-to-vehicle communication with the roadside communication equipment when the vehicle enters the road-to-vehicle communication area and receives radio wave from the roadside communication equipment.

(3) A road-to-vehicle communication system of the above (2), wherein the information that the road-to-vehicle communication equipment received from the roadside communication equipment includes at least warning information for the vehicle to avoid traffic accident if there is a possibility of traffic accident.

(4) A road-to-vehicle communication system of the above (3), wherein if the information that the road-to-vehicle communication equipment receives from the roadside communication equipment includes the warning information, the warning information is outputted to an output device for notifying the driver of the vehicle.

(5) A road-to-vehicle communication system of the above (3), wherein if the information that the road-to-vehicle communication equipment receives from the roadside communication equipment includes the warning information, a control system for controlling running conditions of the vehicle forcedly interferes the control of the vehicle by overriding the driver's control of the vehicle.

(6) A road-to-vehicle communication system of the above (1), wherein if it fails the road-to-vehicle communication with the roadside communication equipment when the vehicle reaches the road-to-vehicle communication area and the road-to-vehicle communication equipment attempts to start road-to-vehicle communication with the roadside communication equipment, the road-to-vehicle communication equipment tries to communicate with the roadside communication equipment from which the road-to-vehicle communication equipment receives radio wave for detecting the communication system of the roadside communication equipment by sequentially changing one or more communication systems that are registered in advance in the vehicle.

(7) A road-to-vehicle communication system of the above (1), wherein if the road-to-vehicle communication equipment receives radio wave from a roadside communication equipment when the vehicle passes through an area that is not registered in the roadmap information as the road-to-vehicle communication possible area, the road-to-vehicle communication equipment tries to communicate with the roadside communication equipment from which the road-to-vehicle communication equipment receives radio wave for detecting the communication system of the roadside communication equipment by sequentially changing one or more communication systems that are registered in advance in the vehicle.

(8) A road-to-vehicle communication system of the above (6), wherein if the communication system of the roadside communication system that the road-to-vehicle communication equipment receives is detected, the roadmap information is renewed based on the road-to-vehicle communication possible or impossible information and the communication system of the roadside communication equipment installed in the area.

(9) A road-to-vehicle communication equipment of the above (1), wherein if road-to-vehicle communication with the roadside communication equipment fails when the vehicle reaches the road-to-vehicle communication possible area and the road-to-vehicle communication equipment attempts to start rod-to-vehicle communication with the roadside communication equipment, such information is reported to a center server that administrates the roadmap information for renewing the roadmap information in the vehicle based upon renewal instructions from the center server.

(10) A road-to-vehicle communication system of the above (1), wherein the driver arbitrarily chooses and sets whether the road-to-vehicle communication with the roadside communication equipment in the road-to-vehicle communication possible area is made or not.

(11) A road-to-vehicle communication method for communicating between a road-to-vehicle communication equipment on a vehicle and a roadside communication equipment installed by a road, comprising the steps of:

including in the roadmap information to be used by the car navigation system on the vehicle at least information to indicate if an area is a road-to-vehicle communication possible area and communication system information indicating the particular communication type of the roadside communication equipment; detecting by the car navigation system if the vehicle approaches the road-to-vehicle communication possible area by a predetermined distance; acquiring from the roadmap information the communication system of the roadside communication equipment installed by the road; setting the road-to-vehicle communication equipment to the acquired communication system; and causing the road-to-vehicle communication equipment to the stand-by state for receiving radio wave.

(12) A road-to-vehicle communication method of the above (11), further comprising the steps of: causing the road-to-vehicle communication equipment to release from the stand-by state when the vehicle reaches the road-to-vehicle communication possible area and receives radio wave from the roadside communication equipment; and starting road-to-vehicle communication with the roadside communication equipment for receiving information the roadside communication equipment.

(13) A road-to-vehicle communication method of the above (12), further comprising the steps of: providing a control system for controlling running conditions of the vehicle; and forcedly interfering the running conditions of the vehicle overriding the driver's vehicle control if the information from the roadside communication equipment that the road-to-vehicle communication equipment receives includes warning information for preventing the vehicle from a possible traffic accident.

(14) A road-to-vehicle communication method of the above (11), further comprising the steps of: causing the road-to-vehicle communication equipment to attempt communication with the roadside communication equipment from which radio wave is received by sequentially changing one or more communication systems for road-to-vehicle communication as registered in the vehicle in advance if it fails in road-to-vehicle communication with the roadside communication equipment when the vehicle reaches the road-to-vehicle communication possible area and starts to road-to-vehicle communication with the roadside communication equipment; and detecting the particular communication system of the roadside communication equipment.

(15) A road-to-vehicle communication method of the above (11), further comprising the steps of: causing the road-to-vehicle communication equipment to attempt communication with the roadside communication equipment from which it receives radio wave by sequentially changing one or more communication systems for road-to-vehicle communication that are registered in the vehicle in advance if the road-to-vehicle communication equipment receives radio wave from the roadside communication equipment when the vehicle passes through an area that is not registered in the roadmap information as the road-to-vehicle communication possible area; and detecting the particular communication system of the roadside communication equipment.

(16) A road-to-vehicle communication equipment of the above (14) further comprising the step of renewing the roadmap information based upon the information indicating if the area where the roadside communication equipment is installed is road-to-vehicle communication possible area and the detected particular communication system of the roadside communication equipment when the road-to-vehicle communication equipment detects the communication system of the roadside communication equipment from which the road-to-vehicle communication equipment receives radio wave.

(17) A road-to-vehicle communication program for implementing the road-to-vehicle communication method of the above (11) as a program executable by a computer.

(18) A program recording medium for recording the road-to-vehicle communication program of the above (17) in a computer readable recording medium.

What is claimed is:

1. A road-to-vehicle communication system comprising:

a road-to-vehicle communication equipment on a vehicle capable of communicating with a roadside communication equipment installed by a road;

roadmap information to be used by a car navigation system on the vehicle includes at least information to indicate whether the road is in an area where the roadside communication equipment is installed for enabling road-to-vehicle communication and communication system information to specify a particular communication system of the roadside communication equipment, wherein when the car navigation system detects the vehicle approaching the road-to-vehicle communication possible area by a predetermined distance, the road-to-vehicle communication system acquires the particular communication system of the roadside communication equipment from the roadmap information, switches the road-to-vehicle communication equipment to the communication settings of the particular communication system and sets to a stand-by state for receiving radio wave from the roadside communication equipment.

2. A road-to-vehicle communication system of claim 1, wherein the road-to-vehicle communication equipment is released from the stand-by state for acquiring information from the roadside communication equipment by starting road-to-vehicle communication with the roadside communication equipment when the vehicle enters the road-to-vehicle communication area and receives radio wave from the roadside communication equipment.

3. A road-to-vehicle communication system of claim 2, wherein the information that the road-to-vehicle communication equipment received from the roadside communication equipment includes at least warning information for the vehicle to avoid traffic accident if there is a possibility of traffic accident.

4. A road-to-vehicle communication system of claim 3, wherein if the information that the road-to-vehicle communication equipment receives from the roadside communication equipment includes the warning information, the warning information is outputted to an output device for notifying the driver of the vehicle.

5. A road-to-vehicle communication system of claim 3, wherein if the information that the road-to-vehicle communication equipment receives from the roadside communication equipment includes the warning information, a control system for controlling running conditions of the vehicle forcedly interferes the control of the vehicle by overriding the driver's control of the vehicle.

6. A road-to-vehicle communication system of claim 1, wherein if it fails the road-to-vehicle communication with the roadside communication equipment when the vehicle reaches the road-to-vehicle communication area and the road-to-vehicle communication equipment attempts to start road-to-vehicle communication with the roadside communication equipment, the road-to-vehicle communication equipment tries to communicate with the roadside communication equipment from which the road-to-vehicle communication equipment receives radio wave for detecting the communication system of the roadside communication equipment by sequentially changing one or more communication systems that are registered in advance in the vehicle.

7. A road-to-vehicle communication system of claim 6, wherein if the communication system of the roadside communication system that the road-to-vehicle communication equipment receives is detected, the roadmap information is renewed based on the road-to-vehicle communication possible or impossible information and the communication system of the roadside communication equipment installed in the area.

8. A road-to-vehicle communication system of claim 1, wherein if the road-to-vehicle communication equipment receives radio wave from a roadside communication equipment when the vehicle passes through an area that is not registered in the roadmap information as the road-to-vehicle communication possible area, the road-to-vehicle communication equipment tries to communicate with the roadside communication equipment from which the road-to-vehicle communication equipment receives radio wave for detecting the communication system of the roadside communication equipment by sequentially changing one or more communication systems that are registered in advance in the vehicle.

9. A road-to-vehicle communication equipment of claim 1, wherein if road-to-vehicle communication with the roadside communication equipment fails when the vehicle reaches the road-to-vehicle communication possible area and the road-to-vehicle communication equipment attempts to start road-to-vehicle communication with the roadside communication equipment, such information is reported to a center server that administrates the roadmap information for renewing the roadmap information in the vehicle based upon renewal instructions from the center server.

10. A road-to-vehicle communication system of claim 1, wherein the driver arbitrarily chooses and sets whether the road-to-vehicle communication with the roadside communication equipment in the road-to-vehicle communication possible area is made or not.

11. A road-to-vehicle communication method comprising:

providing a road-to-vehicle communication equipment on a vehicle capable of communicating with roadside communication equipment installed by a road;

including in roadmap information to be used by a car navigation system on the vehicle at least information to indicate if an area is a road-to-vehicle communication possible area and communication system information indicating a particular communication type of the roadside communication equipment;

detecting by the car navigation system if the vehicle approaches the road-to-vehicle communication possible area by a predetermined distance;

acquiring from the roadmap information the communication system of the roadside communication equipment;

setting the road-to-vehicle communication equipment to the acquired communication system; and setting the road-to-vehicle communication equipment to a stand-by state for receiving radio wave.

12. A road-to-vehicle communication method of claim 11, further comprising the steps of:

causing the road-to-vehicle communication equipment to release from the stand-by state when the vehicle reaches the road-to-vehicle communication possible area and receives radio wave from the roadside communication equipment; and starting road-to-vehicle communication with the roadside communication equipment for receiving information from the roadside communication equipment.

13. A road-to-vehicle communication method of claim 12, further comprising the steps of:

providing a control system for controlling running conditions of the vehicle; and forcedly interfering the running conditions of the vehicle overriding the driver's vehicle control if the information from the roadside communication equipment that the road-to-vehicle communication equipment receives includes warning information for preventing the vehicle from a possible traffic accident.

14. A road-to-vehicle communication method of claim 11, further comprising the steps of:

causing the road-to-vehicle communication equipment to attempt communication with the roadside communication equipment from which radio wave is received by sequentially changing one or more communication systems for road-to-vehicle communication as registered in the vehicle in advance if it fails in road-to-vehicle communication with the roadside communication equipment when the vehicle reaches the road-to-vehicle communication possible area and starts to road-to-vehicle communication with the roadside communication equipment; and detecting the particular communication system of the roadside communication equipment.

15. A road-to-vehicle communication equipment of claim 14 further comprising the step of renewing the roadmap information based upon the information indicating if the area where the roadside communication equipment is installed is road-to-vehicle communication possible area and the detected particular communication system of the roadside communication equipment when the road-to-vehicle communication equipment detects the communication system of the roadside communication equipment from which the road-to-vehicle communication equipment receives radio wave.

16. A road-to-vehicle communication method of claim 11, further comprising the steps of:

causing the road-to-vehicle communication equipment to attempt communication with the roadside communication equipment from which it receives radio wave by sequentially changing one or more communication systems for road-to-vehicle communication that are registered in the vehicle in advance if the road-to-vehicle communication equipment receives radio wave from the roadside communication equipment when the vehicle passes through an area that is not registered in the roadmap information as the road-to-vehicle communication possible area; and detecting the particular communication system of the roadside communication equipment.

17. A road-to-vehicle communication program for implementing the road-to-vehicle communication method of claim 11 as a program executable by a computer.

18. A program recording medium for recording the road-to-vehicle communication program of claim 17 in a computer readable recording medium.

* * * * *